United States Patent
Al-Banna et al.

(10) Patent No.: US 8,553,577 B2
(45) Date of Patent: Oct. 8, 2013

(54) ESTIMATING SYSTEM AND TRAFFIC DATA IN A DOCSIS SYSTEM

(75) Inventors: Ayham Al-Banna, Darien, IL (US); Thomas Cloonan, Lisle, IL (US)

(73) Assignee: Arris Enterprises, Inc., Suwanee, GA (US)

( * ) Notice: Subject to any disclaimer, the term of this patent is extended or adjusted under 35 U.S.C. 154(b) by 164 days.

(21) Appl. No.: 12/900,253

(22) Filed: Oct. 7, 2010

(65) Prior Publication Data

US 2011/0096819 A1 Apr. 28, 2011

Related U.S. Application Data

(60) Provisional application No. 61/254,525, filed on Oct. 23, 2009.

(51) Int. Cl.
*G08C 15/00* (2006.01)
*H04L 12/00* (2006.01)
*H04L 12/24* (2006.01)

(52) U.S. Cl.
USPC .......................................................... 370/252

(58) Field of Classification Search
None
See application file for complete search history.

(56) References Cited

U.S. PATENT DOCUMENTS

| | | | |
|---|---|---|---|
| 7,623,532 B2 * | 11/2009 | Liva et al. .................. 370/401 |
| 7,961,719 B2 * | 6/2011 | Chappell .................... 370/352 |
| 2002/0108123 A1 * | 8/2002 | Colak et al. ................ 725/123 |
| 2003/0046707 A1 * | 3/2003 | Shalvi et al. ............... 725/111 |
| 2008/0273548 A1 * | 11/2008 | Leano et al. ............... 370/442 |

* cited by examiner

*Primary Examiner* — Ayaz Sheikh
*Assistant Examiner* — Blanche Wong
(74) *Attorney, Agent, or Firm* — Troy A. Van Aacken

(57) ABSTRACT

Methods for computing system data (e.g., the number of CMs per DS-SG or US-SG) and traffic data (e.g., the number of online CMs, the number of active CMs, the percentage of time a CM is online, the percentage of time a CM is active, and the concurrency of CMs) in a DOCSIS system are disclosed.

13 Claims, 9 Drawing Sheets

ESTIMATING SYSTEM AND TRAFFIC DATA IN A DOCSIS SYSTEM

CROSS-REFERENCE TO RELATED APPLICATIONS

This application claims the benefit of U.S. Provisional Application Ser. No. 61/254,525, which was filed on Oct. 23, 2009 and is incorporated herein by reference in its entirety.

TECHNICAL FIELD

This disclosure relates to system and traffic data in a DOCSIS system.

BACKGROUND

A DOCSIS system, such as the system 100 shown in FIG. 1, can be used to deliver high-definition digital entertainment and telecommunications such as video, voice, and high-speed Internet to subscribers over an existing cable television network. As shown in FIG. 1, traffic (e.g., data, video, and voice signal) is transferred over a cable network 130 between a Cable Modem Termination System (CMTS) 110 and cable modems (CMs) 120. The CMTS 110 is located at a cable system head-end and the CMs 120 are located at subscriber premises. The cable network 130 can take the form of either an all-coax, all-fiber, or hybrid fiber/coax (HFC) network.

System and traffic data can help traffic engineers make better decisions regarding the DOCSIS system. For example, system and traffic data can be used to decide where and when to perform node splitting. System and traffic data, for example, also can be input to network monitoring systems, can trigger certain response actions, or can be used as input to traffic engineering simulation models.

DETAILED DESCRIPTION

Various implementations of this disclosure compute or estimate system data (e.g., the number of CMs per DS-SG) and traffic data (e.g., the number of online CMs, the number of active CMs, the percentage of time a CM is online, the percentage of time a CM is active, and the concurrency of CMs) in a DOCSIS system.

Figure 1:
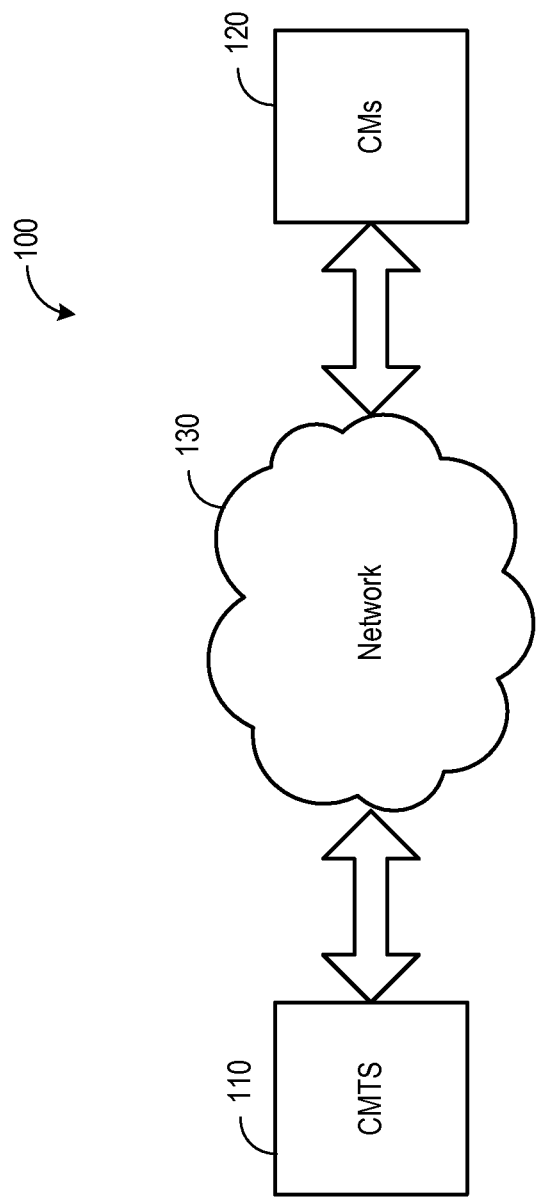
FIG. 1 illustrates a high level block diagram of a DOCSIS system for transferring traffic between a CMTS and a CM over a network.
Figure 2:
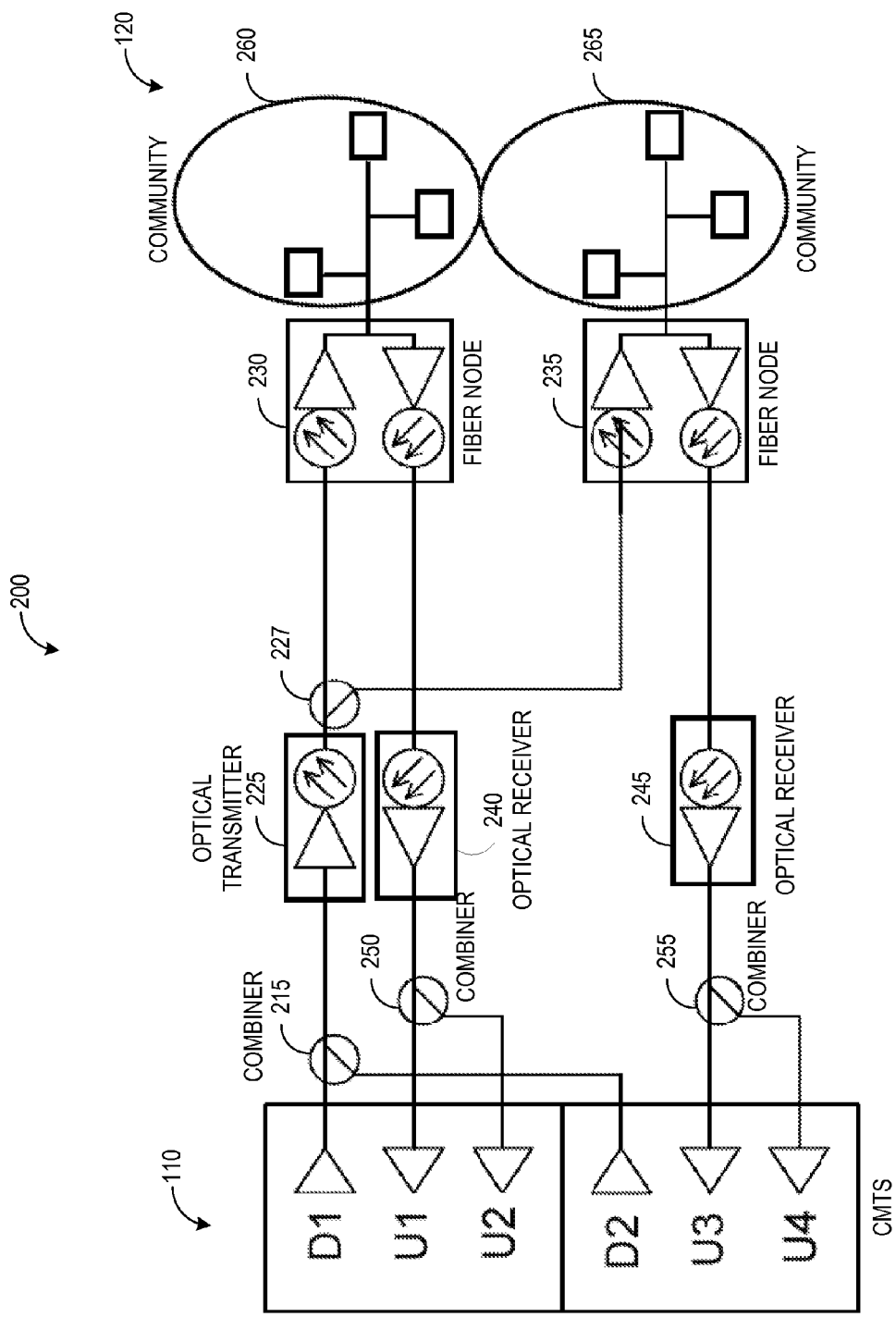
FIG. 2 illustrates a first example DOCSIS system.

FIG. 2 illustrates an example DOCSIS system of FIG. 1. The DOCSIS system 200 of FIG. 2 uses two downstream channels D1 and D2 in conjunction with four upstream channels U1, U2, U3, U4 for bi-directional communication between the CMTS 110 and CMs 120. The downstream channels D1 and D2 are combined by combiner 215 and received by optical transmitter 225. Optical transmitter 225 converts the electrical signals representing the combined downstream channels to optical signals and transmits the optical signals to fiber nodes 230, 235 via coupler 127. Each fiber node 230, 235 includes an optical receiver that converts the received optical signals to electrical signals that are transmitted to the CMs 120 that are served by the fiber node.

Fiber nodes 230, 235 also include an upstream optical transmitter that converts the electrical signals received from the CMs 120 to optical signals and transmits the optical signals to optical receivers 240, 245, respectively. Optical receivers 240, 245 convert the upstream optical signals to electrical signals representing upstream channels U1 and U2 and U3 and U4, respectively, and transmit the electrical signals to CMTS 110 via couplers 250, 255, respectively.

As shown in FIG. 2, there are two geographical communities 260, 265 of cable modems. All the CMs in geographical community 260 are connected to the coax segment of fiber node 230. Accordingly, all CMs in geographical community 260 reach the same set of downstream and upstream channels (namely, D1, D2, U1, and U2). Similarly, all the CMs in geographical community 265 are connected to the coax segment of fiber node 235. Accordingly, all CMs in geographical community 265 reach the same set of downstream and upstream channels (namely D1, D2, U3, and U4).

DOCSIS defines a Cable Modem Service Group (CM-SG) as the complete set of upstream and downstream CMTS channels that reach a single cable modem. For example, in the system of FIG. 2, there are two CM-SGs. CM-SG1 includes D1, D2, U1, and U2 and CM-SG2 includes D1, D2, U3, and U4. In an HFC deployment, all CMs reached by the same fiber node are reached by the same set of channels, as discussed above. Furthermore, in most HFC deployments, each fiber node has a different set of either upstream or downstream channels that reach it. Thus, a CM-SG usually corresponds to the channels reaching a single fiber node, and the CM-SG can sometime be considered to be synonymous with fiber node. For example, in FIG. 2, each of the fiber nodes 230, 235 is a distinct CM-SG.

Figure 3:
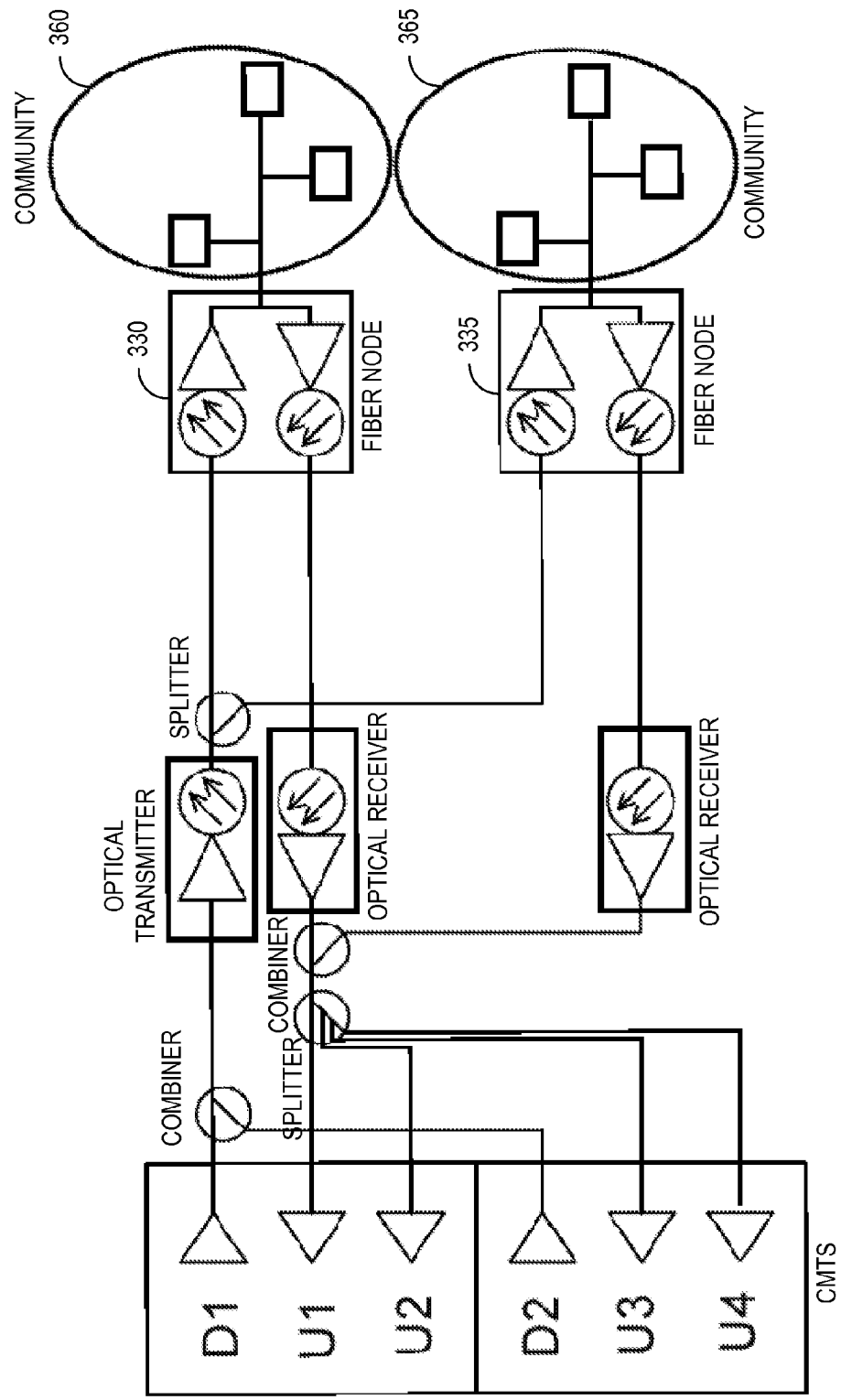
FIG. 3 illustrates a second example DOCSIS system.

However, if two fiber nodes are reached by exactly the same set of downstream and upstream channels, then the CM-SG consisting of that set of channels is considered to contain both fiber nodes. FIG. 3 illustrates an example DOCSIS system where the CM-SG contains two fiber nodes. More specifically, all CMs in geographical community 360 reach D1, D2, U1, U2, U3, and U4. All CMs in geographical community 365 also reach D1, D2, U1, U2, U3, and U4. According, the system of FIG. 3 has one CM-SG, which contains two fiber nodes 330, 335.

Figure 4:
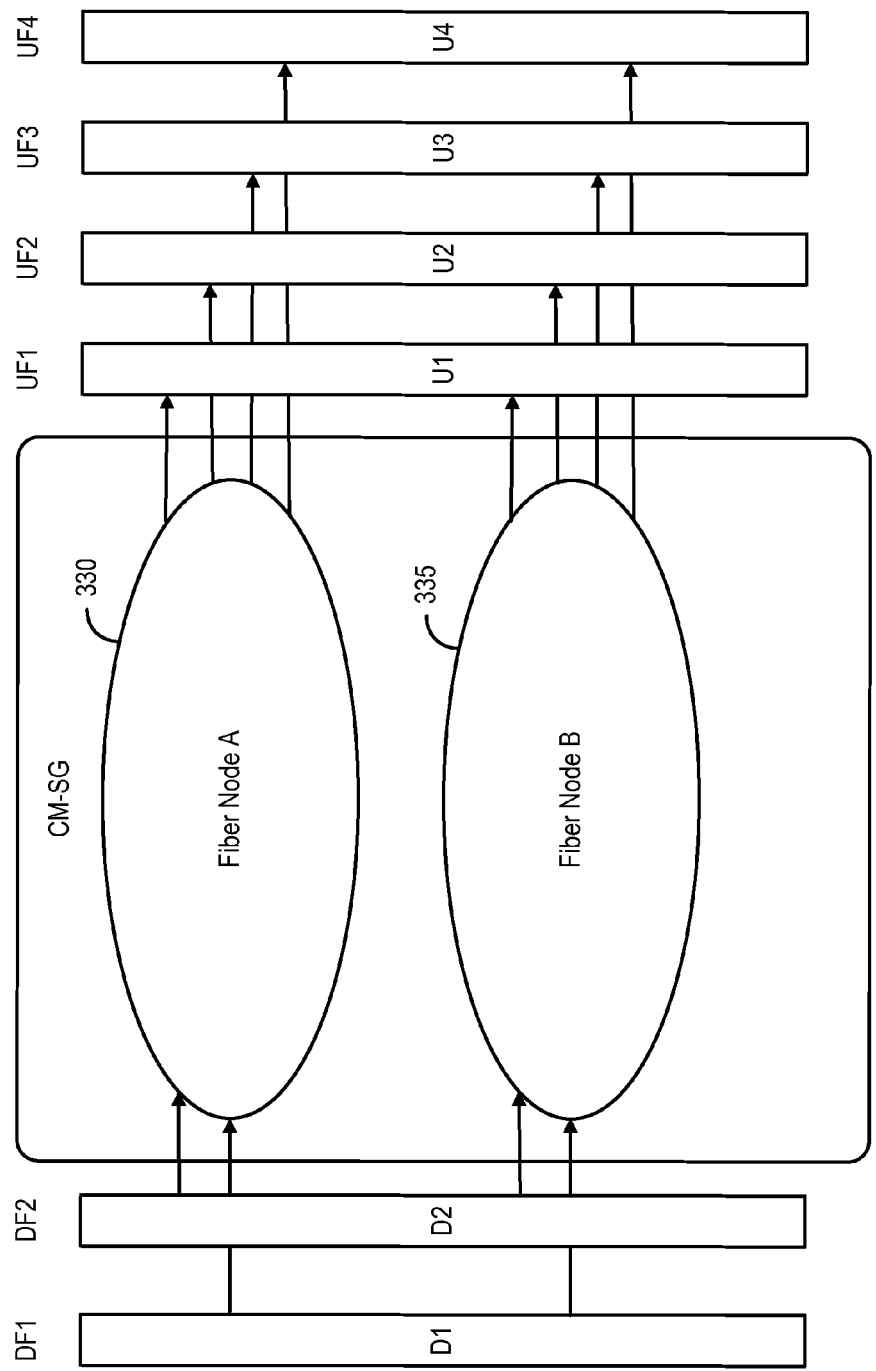
FIG. 4 illustrates a frequency/space diagram of the second example DOCSIS system of FIG. 3.

In some instances, it may be desirable in a DOCSIS system that the RF channels that reach the same fiber node have different frequencies. FIG. 4 illustrates a frequency/space diagram of the system of FIG. 3 that depicts the reachability of downstream and upstream channels. A CMTS downstream channel is said to "reach" a CM when its downstream RF signal can be received by the CM. A CMTS upstream channel is said to "reach" a CM if the CMTS can receive the upstream transmission by that CM. Each vertical column on the left side of FIG. 3 (denoted by the labels DF1, DF2) represents a downstream frequency, while each vertical column on the right side of FIG. 3 (denoted by the labels UF1, UF2, UF3, UF4) represents an upstream frequency. Each rectangle (D1, D2, U1, U2, U3, and U4) represents a channel. As can be seen in FIG. 4, downstream channels D1 and D2 reach the same node(s) (namely, fiber node 330 and fiber node 335) but channels D1 and D2 have different frequencies (namely, DF1 and DF2, respectively). Similarly, upstream channels U1, U2, U3, and U4 reach the same node(s) but the channels have different frequencies (namely, UF1, UF2, UF3, and UF4, respectively).

Figure 5:
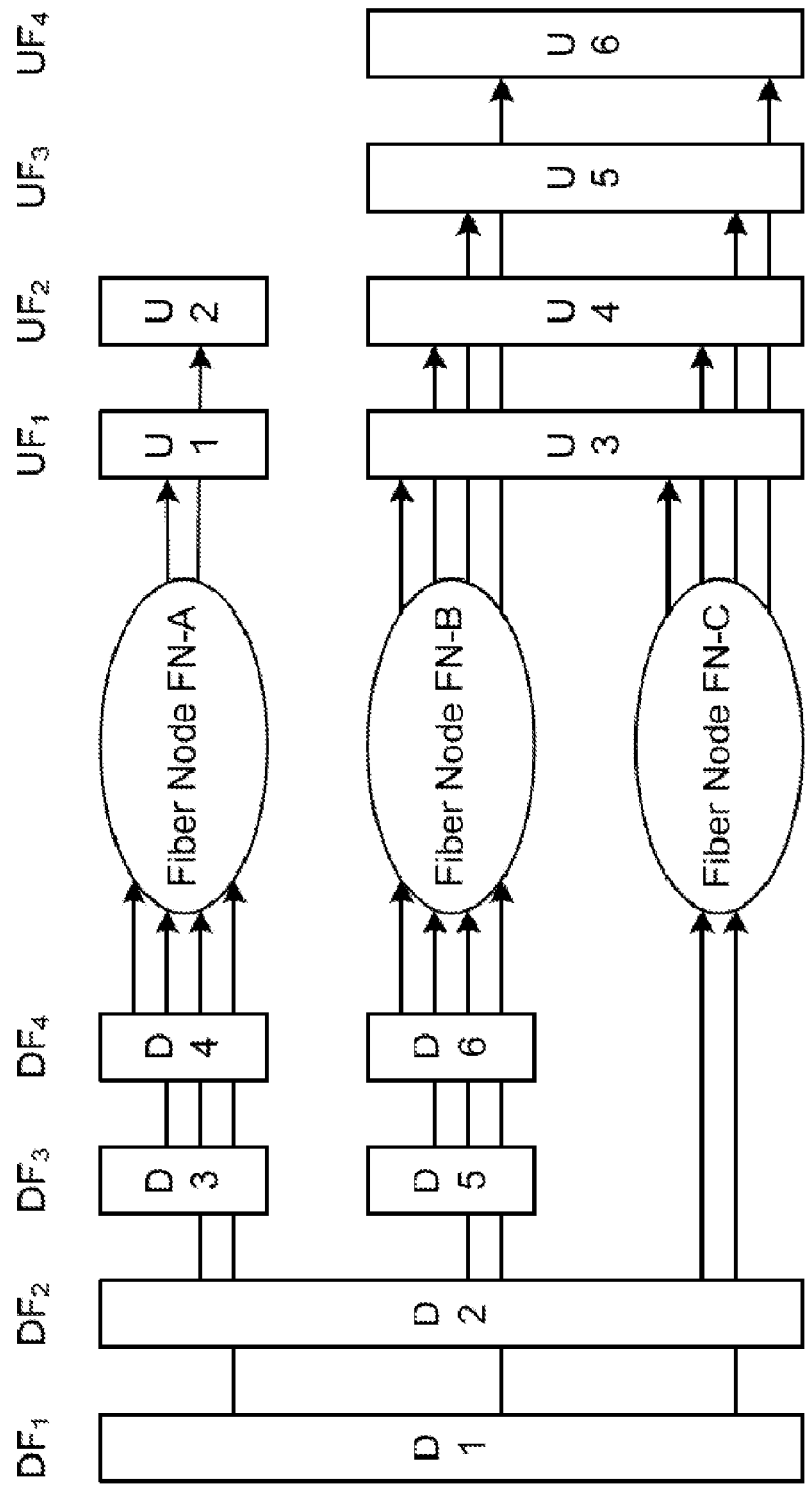
FIG. 5 illustrates a frequency/space diagram of a third example DOCSIS system.

FIG. 5 illustrates a frequency/space diagram of another example DOCSIS system. As shown in FIG. 5, each fiber node is a distinct CM-SG because each fiber node has a different set of either upstream and/or downstream channels that reach it. Furthermore, the RF channels reaching the same node have different frequencies. For example, although downstream channels D3 and D5 have the same frequency (namely, DF3), they reach different fiber nodes. Similarly, downstream channels D4 and D6 have the same frequency (i.e., DF4) but they reach different fiber nodes. For the upstream channels, channels U1 and U3 have the same frequency (i.e., UF1) but they reach different fiber nodes and channels U2 and U4 have the same frequency (i.e., UF2) but they reach different fiber nodes.

Figure 6:
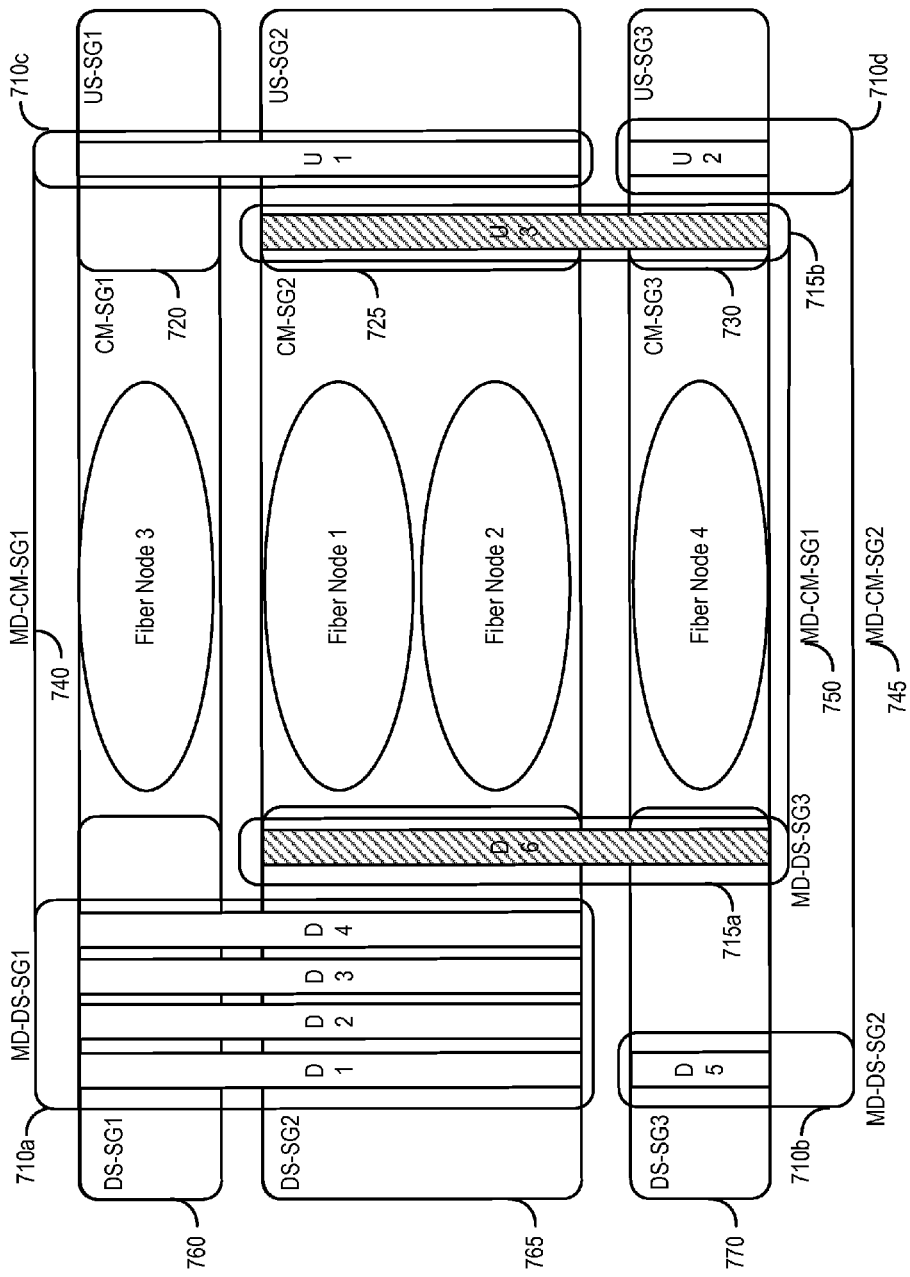
FIG. 6 illustrates a frequency/space diagram of a fourth example DOCSIS system.

In FIGS. 2-5, all channels are assumed to be configured to the same MAC Domain. FIG. 6 illustrates a frequency/space diagram of an example DOCSIS system in which the upstream and downstream channels of the CMTS have been configured to different MAC Domains. The example DOCSIS system of FIG. 6 includes four fiber nodes and two MAC Domains 710a-d, 715a-h MAC Domain 1 (MD1) 710a-d includes the set of channels D1/D2/D3/D4/D5/U1/U2 while MAC Domain 2 (MD2) 715a-b includes the set of channels D6/U3.

DOCSIS defines a MAC Domain CM Service Group (MD-CM-SG) as the set of downstream and upstream channels from the same MAC Domain, all of which reach a single CM. For example, for the DOCSIS system of FIG. 6 there are three CM-SGs: (1) CM-SG1 720 including the set of channels D1/D2/D3/D4/U1; (2) CM-SG2 725 including the set of channels Dl/ D2/ D3/ D4/D6/U3; and (3) CM-SG3 730 including the set of channels D5/D6/U2/U3, For MD1 710a, there are two MD-CM-SGs: (1) MD-CM-SG1 740 including the set of channels D1/D2/D3/D4/U1; and (2) MD-CM-SG2 745 including the set of channels D5/U2. For MD2, there is one MD-CM-SG, namely, MD-CM-SG1 750 including the set of channels D6/U3.

DOCSIS defines a Downstream Service Group (DS-SG) as the set of CMTS downstream channels that can be received by a single CM. An Upstream Service Group (US-SG) is the set of upstream channels in a CMTS that can receive the transmissions of a single CM. Note that a CM-SG, DS-SG, and US-SG are completely defined by the topology configuration of CMTS channels and fiber nodes reached by them. These terms are independent of the assignment of channels to MAC Domains.

A MAC Domain Downstream Service Group (MD-DS-SG) is the set of downstream channels from the some MAC Domain that reaches a fiber node. For example, for the DOCSIS system of FIG. 6, there are three DS-SGs: (1) DS-SG1 760 including the set of channels Dl/D2/D3/D4; (2) DS-SG2 765 including the set of channels D1/D2/D3/D4/D6; and (3) DS-SG3 770 including the set of channels D5/D6, For MD1, there are two MD-DS-SGs: (1) MD-DS-SG1 710a including the set of channels D1/D2/D3/D4/ and (2) MD-DS-SG2 710b including the channel D5. For MD2, there is one MD-DS-SG, namely, MD-DS-SG3 715a including the channel D6.

For traffic engineering purposes, it may be desirable to know the number of cable modems CMs supported per DS-SG. In some instances, the CMTS can be configured with the DOCSIS system topology information. For example, the CMTS can be configured with the list of fiber nodes in the system and which fiber nodes are reached by each downstream and upstream channel. The CMTS also can be configured with the set of MAC Domains in the CMTS and the downstream and upstream channels assigned to each MAC Domain. Based on the topology configuration, in some instances, the CMTS can automatically determine the MD-CM-SGs of the system.

In some instances, the initialization procedure of a CM can be designed such that the CMTS can determine a CM's location in the system topology. That is, the CMTS can determine which downstream channels and upstream channels physically reach the CM. In DOCSIS 3.0, when a CM registers, the CMTS determines the MD-CM-SG of the CM. However, if a MD-CM-SG spans multiple fiber nodes, the CMTS cannot tell to which fiber node a CM is physically connected. Thus, although it is known in the CMTS the number of cable modems per MD-CM-SG, when a MD-CM-SG spans multiple fiber nodes, there is no knowledge by the CMTS of the number of cable modems per fiber node. Accordingly, there is no knowledge in the CMTS of the number of cable modem per DS-SG.

Figure 7:
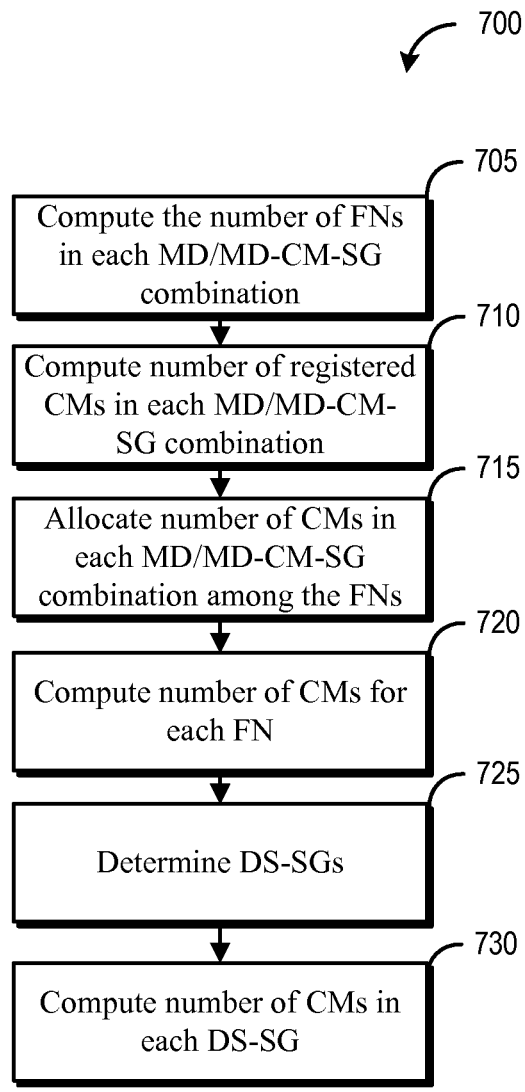
FIG. 7 illustrates an example process for estimating the number of CMs per DS-SG of a DOCSIS system.

FIG. 7 illustrates a process 700 for estimating the number of CMs per DS-SG of a DOCSIS system.

At stage 705, the number of fiber nodes in each MD/MD-CM-SG combination of the DOCSIS system is computed. In some implementations, the DOCIS Management Information Base (MIB) object docsIf3MdNodeStatusEntry stored in the CMTS can be used to compute the number of fiber nodes in each MD/MD-CM-SG combination. For example, for the system of FIG. 6, docsIf3MdNodeStatusEntry can be used to derive the associations illustrated in Table 1.

TABLE 1

| IfIndex (MD) | MD-CM-SG | Node Name | MD-DS-SG |
|---|---|---|---|
| 1 | 1 | FN1 | MD-DS-SG1 |
| 1 | 1 | FN2 | MD-DS-SG1 |
| 1 | 1 | FN3 | MD-DS-SG1 |
| 2 | 1 | FN1 | MD-DS-SG3 |
| 2 | 1 | FN2 | MD-DS-SG3 |
| 2 | 1 | FN4 | MD-DS-SG3 |
| 1 | 2 | FN4 | MD-DS-SG2 |

Table 1 lists the fiber nodes for each MD/MD-CM-SG combination in the DOCSIS system of FIG. 6 along with the MD-DS-SG associated with the MD/MD-CM-SG combination. As listed in Table 1, there are three MD/MD-CM-SG combinations for the system of FIG. 6: (MD1, MD-CM-SG1), (MD1, MD-CM-SG2), and (MD2, MD-CM-SG1). For the MD/MD-CM-SG combination (MD1, MD-CM-SG1) (see rows 2-4), there are three (3) FNs (i.e., FN1, FN2, FN3), and MD-DS-SG1 is associated with this combination. For the MD/MD-CM-SG combination (MD1, MD-CM-SG2) (see row 8), there is one (1) FN (i.e., FN4), and MD-DS-SG2 is associated with this combination. For the MD/MD-CM-SG combination (MD2, MD-CM-SG1) (see rows 5-7), there are three (3) FNs (i.e., FN1, FN2, FN4), and MD-DS-SG3 is associated with this combination.

At stage 710, the number of registered modems in each MD/MD-CM-SG combination is computed. In some implementations, the DOCIS MIB object docsIf3CmtsCmReg StatusEntry stored in the CMTS is used to compute the number of registered modems in each MD/MD-CM-SG combination. DocsIf3CmtsCmRegStatusEntry can be used to retrieve from the CMTS the registration status of each CM in the DOCSIS system and then associate each CM with a MD/MD-CM-SG combination. For example, docsIf3CmtsCmRegStatusEntry can be used to retrieve from a CMTS the example CM registration statuses and associations illustrated in Table 2.

TABLE 2

| StatusId | Status Value | MD | MD-CM-SG |
|---|---|---|---|
| id1 | 6 | 1 | 1 |
| id2 | 6 | 1 | 1 |
| id3 | 6 | 1 | 1 |
| id4 | 6 | 1 | 1 |
| id5 | 6 | 1 | 1 |
| id6 | 6 | 1 | 1 |
| id7 | 6 | 1 | 1 |
| id8 | 6 | 1 | 2 |
| id9 | 6 | 2 | 1 |
| id10 | 6 | 2 | 1 |

Each row of Table 2 represents a CM and provides the registration status of the CM along with the MD/MD-CM-SG combination associated with the CM. In some implementations, a status value=6 indicates that the corresponding CM is registered. The number of modems in a MD/MD-CM-SG combination is incremented when a registered modem is found to belong to that combination. Thus, as listed in Table 2, there are 7 registered modems in the MD/MD-CM-SG combination (MD1, MD-CM-SG1); 1 registered modem in the MD/MD-CM-SG combination (MD1, MD-CM-SG2); and 2 registered modems in the MD/MD-CM-SG combination (MD2, MD-CM-SG1).

For the DOCSIS system of FIG. 6, it will be assumed that there are X1 registered modems in the MD/MD-CM-SG combination (MD1, MD-CM-SG1); X3 registered modem in the MD/MD-CM-SG combination (MD1, MD-CM-SG2); and X2 registered modems in the MD/MD-CM-SG combination (MD2, MD-CM-SG1).

As discussed above, the CMTS does not know the number of CMs in each of the FNs in the CM-SG spanned by a MD/MD-CM-SG combination. Therefore, at stage 715, the number of CMs in each MD/MD-CM-SG combination computed at stage 710 is allocated among the fiber nodes computed at stage 705. In one implementation, the CMs in a MD/MD-CM-SG combination are equally distributed among the FNs in a CM-SG spanned by the MD/MD-CM-SG combination.

For example, for the DOCSIS system of FIG. 6, as discussed above with reference to stage 705, there are three (3) FNs (i.e., FN1, FN2, FN3) for the MD/MD-CM-SG combination (MD1, MD-CM-SG1); there is one (1) FN (i.e., FN4) for the MD/MD-CM-SG combination (MD1, MD-CM-SG2); and there are three (3) FNs (i.e., FN1, FN2, FN4) for the MD/MD-CM-SG combination (MD2, MD-CM-SG1).

The number of CMs computed at stage 710 for each MD/MD-CM-SG combination is allocated among the fiber nodes computed at stage 705.

Thus, in one implementation, the X1 registered modems in the MD/MD-CM-SG combination (MD1, MD-CM-SG1) can be equally distributed among the three (3) FNs for the combination. Accordingly, it can be estimated that FN1 has X1/3 registered modems, FN2 has X1/3 registered modems, and FN3 has X1/3 registered modems.

Similarly, the X2 registered modems in the MD/MD-CM-SG combination (MD2, MD-CM-SG1) can be equally distributed among the three (3) FNs for the combination. Accordingly, it can be estimated that FN1 has an additional X2/3 registered modems, FN2 has an additional X2/3 registered modems, and FN4 has X2/3 registered modems.

Since there is one FN for the MD/MD-CM-SG combination (MD1, MD-CM-SG2), FN4 has an additional X3 registered modems.

Table 1 can be modified as illustrated in Table 3 to contain an extra data count (i.e., the number of CMs) for each FN.

TABLE 3

| IfIndex (MD) | MD-CM-SG | Node Name | MD-DS-SG | #CMs |
|---|---|---|---|---|
| 1 | 1 | FN1 | MD-DS-SG 1 | X1/3 |
| 1 | 1 | FN2 | MD-DS-SG 1 | X1/3 |
| 1 | 1 | FN3 | MD-DS-SG 1 | X1/3 |
| 2 | 1 | FN1 | MD-DS-SG 3 | X2/3 |
| 2 | 1 | FN2 | MD-DS-SG 3 | X2/3 |
| 2 | 1 | FN4 | MD-DS-SG 3 | X2/3 |
| 1 | 2 | FN4 | MD-DS-SG 2 | X3/1 |

At stage 720, the number of CMs for each FN is computed by adding the CMs allocated to the FN from all MD/MD-CM-SG combinations. For example, using Table 3, FN1 has (X1)/3 (from MD/MD-CM-SG combination (MD1, MD-CM-SG1))+(X2)/3 (MD/MD-CM-SG combination (MD2, MD-CM-SG1)) registered CMs; FN2 has (X1)/3 (from MD/MD-CM-SG combination (MD1, MD-CM-SG1))+(X2)/3 (from MD/MD-CM-SG combination (MD2, MD-CM-SG1)) registered CMs; FN3 has (X1)/3 (from MD/MD-CM-SG combination (MD1, MD-CM-SG1)) registered modems; and FN4 has (X2)/3 (from MD/MD-CM-SG combination (MD2, MD-CM-SG1))+X3 (from MD/MD-CM-SG combination (MD1, MD-CM-SG2)).

At stage 725, the DS-SGs of the DOCSIS system are determined. As discussed above, a DS-SG is a set of CMTS downstream channels that can be received by a single CM. In one implementation, the DS-SGs can be determined by grouping FNs that have the same MD/MD-CM-SG combinations. For example, for the system of FIG. 6, FN1 is in the MD/MD-CM-SG combination (MD1, MD-CM-SG1) and (MD2, MD-CM-SG1); FN2 is in the MD/MD-CM-SG combination (MD1, MD-CM-SG1) and (MD2, MD-CM-SG1); FN3 is in the MD/MD-CM-SG combination (MD1, MD-CM-SG1); and FN4 is in the MD/MD-CM-SG combination (MD1, MD-CM-SG2) and (MD2, MD-CM-SG1). Because FN1 and FN2 have the same MD/MD-CM-SG combinations, FN1 and FN2 are in the same CM-SG (CM-SG2) and DS-SG (DS-SG2). FN3 has its own CM-SG (i.e., CM-SG1) and DS-SG (DS-SG1); similarly, FN4 has its own CM-SG (CM-SG3) and DS-SG (DS-SG3).

At stage 730, the number of CMs in each DS-SG is computed. For example, for the system of FIG. 6, as determined at stage 725, DS-SG1 includes FN3, which, as estimated at stage 720, has (X1)/3 registered CMs. Similarly, DS-SG2 includes FN1 and FN2 which, as estimated at stage 720, have (X1)/3+(X2)/3 and (X1)/3+(X2)/3 registered CMs, respectively, for a total of 2(X1)/3+2(X2)/3 registered CMs in DS-SG2. DS-SG3 includes FN4, which has (X2)/3+X3 registered CMs.

Since the type of each modem in the DOCSIS system may be known, the percentage of channel-bonding incapabable CMs and channel-bonding capable (wideband) CMs in the system can be computed.

A process similar to process 700 can be used to estimate the number of CMs per US-SG.

For traffic engineering purposes, it also may be desirable to know the number of online CMs, the number of active CMs, the percentage of time a CM is online, the percentage of time a CM is active, and the concurrency of CMs in a DOCSIS system.

Figure 8:
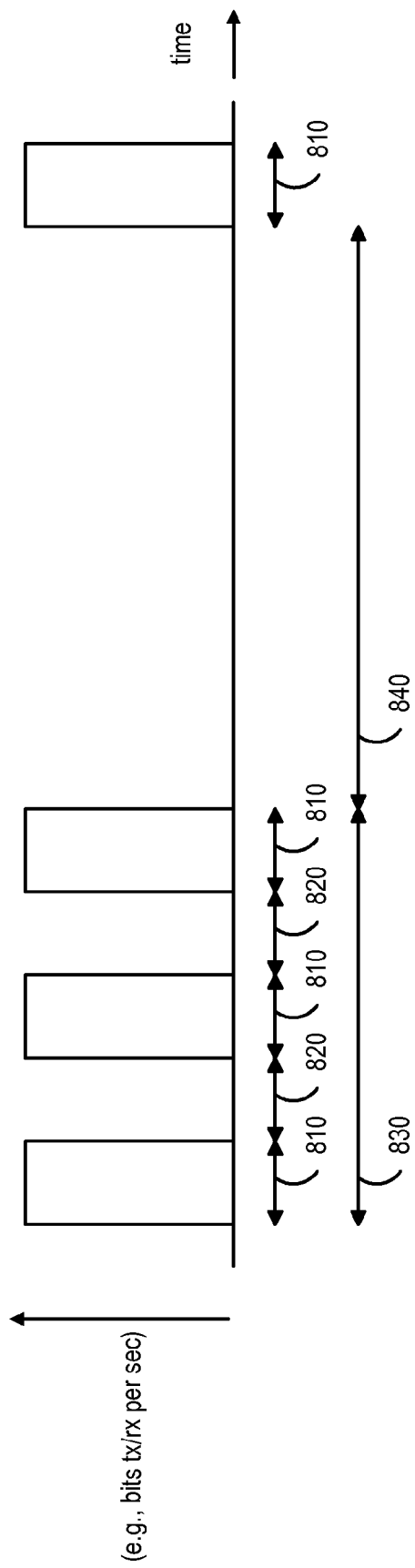
FIG. 8 illustrates the active, inactive, online, and offline times of a CM.

An online CM is a CM that continuously or periodically engages in transmitting and/or receiving traffic where the periods of inactivity are less than a predetermined wait time, $T_w$. Referring to FIG. 8, an online CM is considered an active CM during the periods 810 in which the CM is transmitting and/or receiving traffic. So long as a period of inactivity 820 is less than $T_w$, a CM is still considered to be online but inactive. Thus, the online time 830 for a CM includes the periods of activity and inactivity so long as the periods of inactivity are less than $T_w$. If a period of inactivity exceeds $T_w$, the period of inactivity is considered offline time 840.

A CM can be classified as inactive, normal active, or heavy active based on the CM's current usage rate (C). In one implementation, the usage rate of a CM can be considered the number of bytes used (e.g., transmitted and/or received) by the CM during a period of time.

Figure 9:
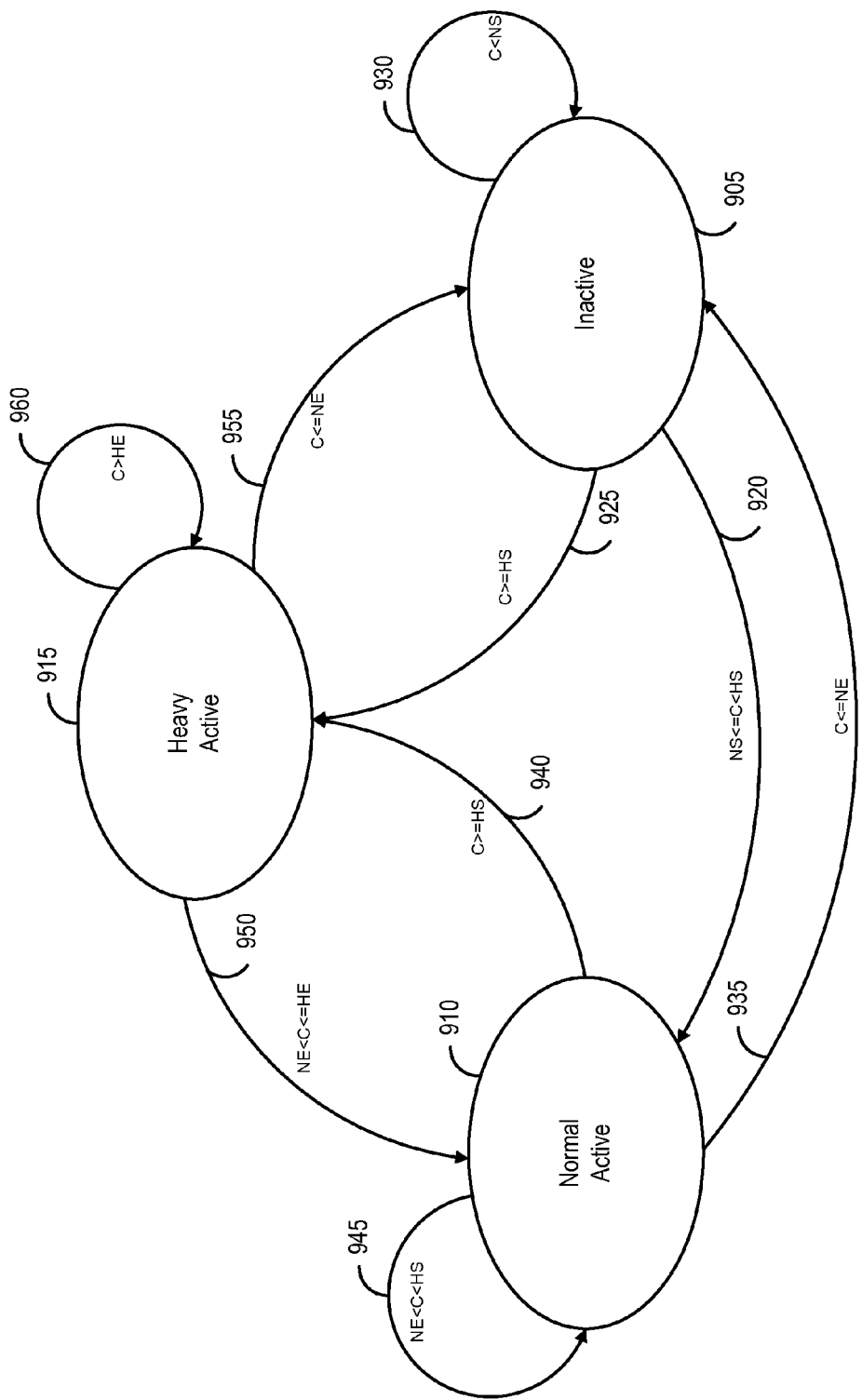
FIG. 9 illustrates an example state machine having three states that characterize a CM's current usage rate (C).

FIG. 9 illustrates an example state machine having three states (i.e., inactive, normal active, or heavy active) based on a CM's current usage rate (C). FIG. 9 illustrates how the CM's current usage rate (C) can determine the CM's state.

Referring to FIG. 9, if a CM is in an inactive state 905, the CM will remain in this state until the CM's current usage rate (C) either equals or exceeds a normal start (NS) usage rate (i.e., transition 920) to enter the normal active state 910 or equals or exceeds a heavy start (HS) usage rate (i.e., transition 925) to enter the heavy active state 915. In other words, the CM will remain in the inactive state 905 as long as the CM's current usage rate (C) is less that NS 930. Each time the CM enters and leaves the inactive state 905, the elapsed time spent in the state can be added to either an inactive time, $T_{inactive}$, or an offline time, $T_{offline}$. The inactive time, $T_{inactive}$, is the total time over an observation period that the CM is inactive; the offline time, $T_{offline}$, is the total time over an observation period that the CM is offline. If the elapsed time in the inactive state is less than a predetermined wait time, $T_w$, the elapsed time is added to the inactive time, $T_{inactive}$. Otherwise, the elapsed time is added to the offline time, $T_{offline}$.

If the CM is in the normal active state 910, the CM will remain in this state until the CM's current usage rate (C) either equals or becomes lower than a normal end (NE) usage rate (i.e., transition 935) to enter the inactive state 905 or equals or exceeds HS (i.e., transition 940) to enter the heavy active state 915. In other words, the CM will remain in the normal active state 910 as long as the CM's current usage rate (C) is greater than NE and less than HS 945. Each time the CM enters and leaves the normal active state 910, the elapsed time spent in the state is added to the active time, $T_{active}$. The active time, $T_{active}$, is the total time over an observation period that the CM is active.

If the CM is in the heavy active state 915, the CM will remain in this state until the CM's current usage rate (C) either equals or becomes lower than a heavy end (HE) usage rate (i.e., transition 950) to enter the normal active state 910 or equals or becomes lower than NE (i.e., transition 955) to enter the inactive state 905. In other words, the CM will remain in the heavy active state 915 as long as the CM's current usage rate (C) is greater than HE. Each time the CM enters and leaves the heavy active state 915, the elapsed time spent in the state is added to the active time, $T_{active}$.

In some implementations, 0<NE<NS<HE<HS.

Using the above calculations, the following equation then can be used to determine the online time, $T_{online}$, for a CM:

$$T_{online} = T_{active} + T_{inactive} \quad (1)$$

The following equation then can be used to determine the percentage of time a CM is online, % $T_{online}$:

$$\% T_{online} = \frac{T_{online}}{T_{online} + T_{offline}} \times 100\% \quad (2)$$

The following equation can be used to determine the percentage of oneline time a CM is active, % $T_{active}$:

$$\% T_{active} = \frac{T_{active}}{T_{online}} \times 100\% \quad (3)$$

The average over a predetermined number, n, of CMs of % $T_{online}$ can be computed as $$1/n \cdot \sum_{i=0}^{n} \% T_{online_i},$$

where % $T_{online_i}$ is the percentage of time a CM is online for the i-th CM in the system and n can be any number up to the number of CMs in the system. In some implementations, because many of the activity statistics are estimated based on probability theory and stochastic processes and for computational efficiency, n is selected to be less than the total number of CMs in the system but large enough to reflect the behavior of all subscribers. Thus, the following equations can be used to estimate the percentage of online CMs, % $N_{onlineCMs}$, and the number of online CMs, $N_{onlineCMs}$, respectively:

$$\% N_{onlineCMs} = 1/n \cdot \sum_{i=0}^{n} \% T_{online_i} \quad (4)$$

$$N_{onlineCMs} = \% N_{onlineCMs} \times N_{totalCMs}, \quad (5)$$

where $N_{totalCMs}$ equals the total number of CMs in the system.

Similarly, the average over a predetermined number of CMs of % $T_{active}$ can be computed as $$1/n \cdot \sum_{i=0}^{n} \% T_{active_i},$$

where % $T_{active_i}$ is the percentage of time a CM is active for the i-th CM in the system. Thus, the following equations can be used to estimate the percentage of active CMs, % $N_{activeCMs}$, and the number of active CMs, $N_{activeCMs}$, respectively:

$$\% N_{activeCMs} = 1/n \cdot \sum_{i=0}^{n} \% T_{active_i} \quad (6)$$

$$N_{activeCMs} = \% N_{activeCMs} \times N_{onlineCMs} \quad (7)$$

or $$N_{activeCMs} = 1/n^2 \cdot \sum_{i=0}^{n} \% T_{active_i} \cdot \sum_{i=0}^{n} \% T_{online_i} \times N_{totalCMs} \quad (8)$$

The following equation can be used to estimate the concurrency of CMs in the system:

$$\text{concurrency} = \% \, T_{online} \cdot \% \, T_{active} \quad (9)$$

Equations (1)-(9) can be computed for channel-bonding capable CMs (wideband CMs) only, for channel-bonding incapable CMs (legacy CMs) only, or for a mixture of modems. Since the type of each modem in the DOCSIS system may be known, the percentage of legacy CMs and wideband modems CM that are active in the system can be computed.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A method for determining system data in a data over cable service interface specification (DOCSIS) system, the method comprising:
   computing fiber nodes in each media access control (MAC) domain (MD) and MAC Domain CM Service Group (MD-CM-SG);
   computing registered cable modems in each MD and MD-CM-SG; and
   for each MD and MD-CM-SG, allocating the registered cable modems in each the MD and MD-CM-SG among the fiber nodes in a cable modem-service group (CM-SG) included in a respective MD-CM-SG; and
   computing the registered cable modems for each fiber node;
   wherein computing the number of fiber nodes in each MD and MD-CM-SG comprises utilizing the DOCSIS Management Information Base (MIB) object docsIf3MdNodeStatusEntry to obtain the MD and MD-CM-SGs and fiber nodes for each MD and MD-CM-SG.

2. The method of claim 1 wherein computing the number of registered cable modems in each MD and MD-CM-SG comprises utilizing the DOCIS Management Information Base (MIB) object docsIf3CmtsCmRegStatusEntry to retrieve the registration status of each CM in the DOCSIS system and a the corresponding MD and MD-CM-SG to which the CM belongs and incrementing a number of registered cable modems in the MD and MD-CM-SGs by one when a registered cable modem is found to allocated to the MD and MD-CM-SGs.

3. The method of claim 1 wherein the number of registered cable modems in the MD and MD-CM-SG are equally distributed among the fiber nodes in the CM-SG included in the MD and MD-CM-SG.

4. The method of claim 1 wherein computing the registered cable modems for each fiber node comprises, for each fiber node, adding the registered cable modems allocated to the fiber node from all MD and MD-CM-SG.

5. The method of claim 1, further comprising:
   determining the Downstream Service Groups (DS-SGs) of the DOCSIS system; and
   computing the number of registered cable modems in each of the DS-SG.

6. The method of claim 5 wherein determining the DS-SGs of the DOCSIS system comprises grouping the fiber nodes that have the same MD-CM-SGs combinations in the DS-SG.

7. The method of claim 5 wherein computing the number of registered cable modems in each DS-SG comprises for each DS-SG, adding registered cable modems allocated to each fiber node of the DS-SG.

8. The method of claim 1, further comprising:
   determining Upstream Service Groups (US-SGs) associated with the DOCSIS system; and
   computing the number of cable modems in each of the US-SGs.

9. A system for determining system data in a data over cable service interface specification (DOCSIS) system, the system comprising:
- means for computing fiber nodes in each media access control (MAC) Domain (MD) and MAC Domain-Cable Modem-Service Group; (MD-CM-SG)
- means for computing registered cable modems in each MD and MD-CM-SG; and
- means for allocating, for each MD and MD-CM-SG, the registered cable modems in each MD and MD-CM SGs among fiber nodes in a Cable Modem-Service Group (CM-SG) included in a respective the MD and MD-CM-SG; and
- means for computing the registered cable modems for each fiber node;
- wherein the means for computing the fiber nodes in each MD and MD-CM-SG comprises utilizing the DOCSIS Management Information Base (MIB) object docsIf3MdNodeStatusEntry to obtain the MD and MD-CM-SGs and the fiber nodes for each MD and MD-CM-SG.

10. The system of claim 9, further comprising:
- means for determining Downstream Service Groups (DS-SGs) associated with the DOCSIS system; and
- means for computing the registered cable modems in each of the DS-SG.

11. A method of computing traffic data in a data over cable service interface specification (DOCSIS) system comprising:
- computing the amount of time a cable modem spends in an inactive state over an observation period, an inactive time;
- computing the amount of time the cable modem spends offline over the observation period, an offline time;
- computing the amount of time the cable modem spends in an active state over the observation period, an active time; and
- computing an online time of the cable modem as the active time plus the inactive time.

12. The method of claim 11 further comprising computing a percentage of time the cable modem is online as the online time divided by the sum of the online time and the offline time multiplied by 100%.

13. The method of claim 11 further comprising computing the percentage of time a cable modem is active as the active time divided by the online time multiplied by 100%.

* * * * *